United States Patent [19]

Csakvary

[11] Patent Number: 4,608,746

[45] Date of Patent: Sep. 2, 1986

[54] WIRE HARNESS FABRICATION APPARATUS

[75] Inventor: Tibor Csakvary, Pittsburgh, Pa.

[73] Assignee: Unimation, Inc., Danbury, Conn.

[21] Appl. No.: 591,365

[22] Filed: Mar. 20, 1984

[51] Int. Cl.[4] ............ B23Q 41/00

[52] U.S. Cl. ............ 29/564.4

[58] Field of Search ............ 29/564.4, 564.5, 861; 140/92.2, 93 R; 339/276 F

[56] References Cited

U.S. PATENT DOCUMENTS

| | | | |
|---|---|---|---|
| 1,847,078 | 3/1932 | Buente | 140/92.2 |
| 3,550,645 | 12/1970 | Keogh | 140/92.2 |
| 3,706,122 | 12/1972 | La Valle | 29/203 D |
| 4,159,158 | 6/1979 | Weidler | 339/276 F X |
| 4,171,566 | 10/1979 | Tominoi | 29/748 |
| 4,330,927 | 5/1982 | Wolfthal | 29/564.4 |
| 4,373,261 | 2/1983 | Long | 29/861 |

*Primary Examiner*—Eugene F. Desmond
*Attorney, Agent, or Firm*—Thomas R. Trempus

[57] ABSTRACT

The invention is a wire harness fabrication apparatus for use in the manual fabrication of wire harnesses and as a wire receiving member for use in combination with an automated factory cell. The apparatus is a rotatable cylindrical member with a continuous surface upon which the wire is disposed. The wire is secured to the continuous surface by clamps and the various branches of the harness are defined by further clamps and routing pins. The various lengths of wire are secured to the surface as the cylindrical member rotates about a generally horizontal axis. Upon completion of the fabrication of the wire harness, the cylindrical member is rotated in the opposite direction to remove the wire harness.

6 Claims, 3 Drawing Figures

WIRE HARNESS FABRICATION APPARATUS

FIELD OF THE INVENTION

The invention relates to the manufacture of wire harnesses, and particularly, it relates to an apparatus for wire harness fabrication which can be employed in either a manual operation or a fully automated manufacturing cell.

BACKGROUND OF THE INVENTION

In the wire harness fabrication process, a number of different type, size and length of wires are cut to length, marked, assembled, tied, and terminated. The process usually takes place on a flat board studded with pins which are prearranged in a predetermined pattern. The wires are then laid into the pin pattern either manually or automatically. U.S. Pat. No. 3,706,122 discloses an apparatus for the assembly of electrical components in which a rotatable turntable is used. When connecting wires to the components, the wire is wound around the turntable for part of a complete cycle. The conventional method of wire harness fabrication is a labor intensive, slow process and, because of the nature and size of the pin boards, it is difficult to use automatic techniques to reduce errors and labor content.

It is, therefore, an object of this invention, to provide a wire harness fabrication apparatus which is compact in size relative to the conventional devices available and which can be either manually or automatically operationed.

It is a further object of this invention to provide a wire harness fabrication apparatus which can be employed in combination with presently available factory automation equipment to form a wire harness manufacturing cell.

It is yet another object of this invention to provide a wire harness fabricattion apparatus on which extremely long harness can be formed without unnecessary bends or directional changes in the wire.

SUMMARY OF THE INVENTION

The invention is an apparatus for wire harness formation which comprises a support means defining an axis and a cylindrical wire receiving means rotatably mounted on the axis. The cylindrical means has a continuous surface which includes means for demountably receiving and securing thereon one or more lengths of wire according to a predetermined pattern. In one embodiment, the means for receiving and securing lengths of wire comprise a plurality of axially disposed members extending from the continuous surface, and a clip means which receives the wire thereon and attaches to an axially disposed member. In an alternative embodiment, the continuous surface includes a plurality of bores therein and pin-like members are adapted to be disposed therein and to secure the length of wire thereby.

The apparatus of this invention can be used in combination with means for automatically placing the lengths of wire on the continuous surface, properly tying the wire harness together and terminating the ends of each length of wire.

BRIEF DESCRIPTION OF THE DRAWINGS

The above as well as other features and advantages of the present invention will become apparent through consideration of the detailed description in connection with the accompanying drawings in which.

DETAILED DESCRIPTION OF THE INVENTION

Figure 1:
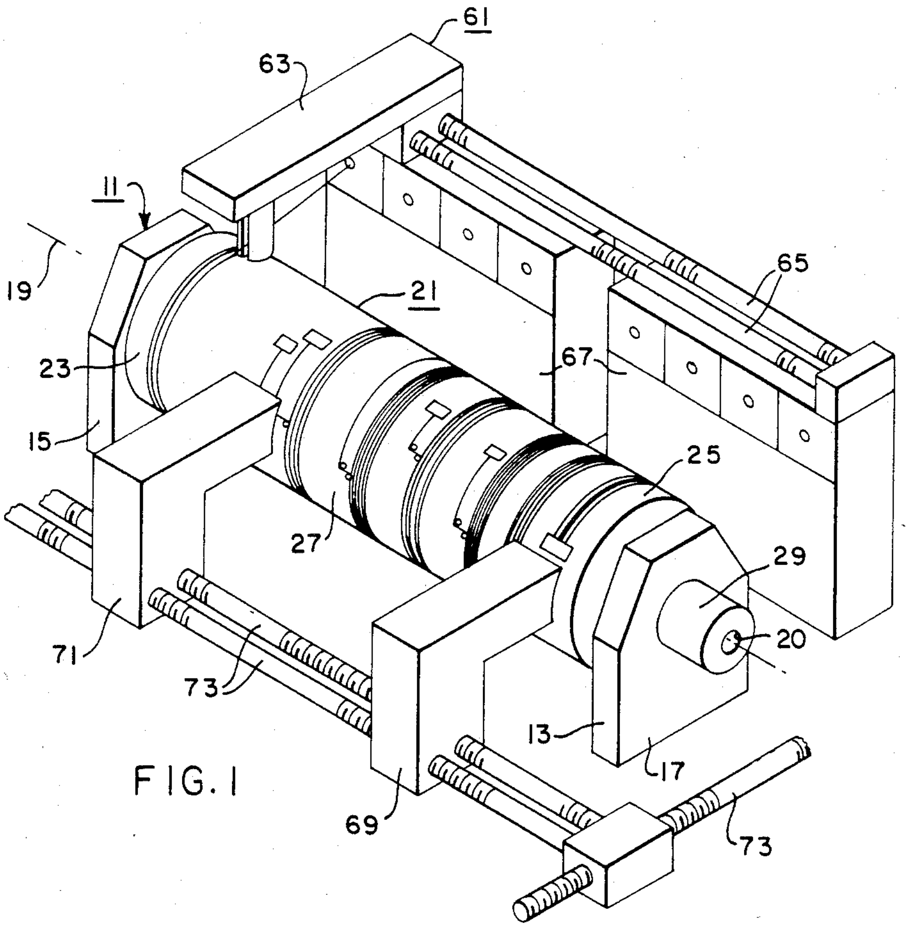
FIG. 1 is a somewhat schematical representation of a wire harness fabrication apparatus according to this invention shown in combination with an automated factory cell environment.

The wire harness fabrication apparatus of this invention can be utilized either alone, as a manually operated device, or as an integral element in an automated manufacturing cell. By use of the term wire harness, it is to be understood that in addition to copper and other conventional electrically conductive materials, fiber optic conductors are also to be included. Turning to FIG. 1, a rotary wire harness fabrication apparatus according to the teachings of this invention is generally indicated by the reference character 11. While the wire harness of this invention is described as being mounted for rotation about a generally horizontally disposed axis, it is to be recognized that the apparatus can be mounted for rotation about an axis disposed up to and through the vertical. The apparatus 11 includes a support means 13 having a first generally vertical cantilevered member 15 and a second generally vertical cantilevered member 17, which members define therebetween a preferably horizontally disposed axis 19. A cylindrical member 21 is concentrically mounted on the axis member 20 for controllable rotational movement. The cylindrical member 21 is drum-like in its general configuration and consists of opposed ends 23 and 25 and a continuous surface 27. The opposed ends 23 and 25 include means, by which the rotational movement is facilitated and controlled. In one configuration, the cylindrical member 21 can be fixedly secured to the axis member 20 which is in turn journalled to the cantilevered members 15 and 17. Alternatively, the axis member 20 can be fixedly mounted to the cantilevered members 15 and 17 and the opposed ends 23 and 25 of the cylindrical member 21 provided with bearing means to permit rotation thereof about the axis member 20. The controllable rotational movement of the cylindrical member 21 can be effected by one of several techniques contemplated by this invention and schematically represented at 29. For example, in manual operations, a hand crank or low rpm motor can be geared to the cylindrical member 21 to rotate the same. On the other hand, a servomotor system can be provided for a fully automated, factory cell utilization of this invention, as will be described hereinafter.

While the cylindrical member 21 can, of course, be constructed to conform to a variety of dimensional requirements, it is expected that a typical cylindrical member 21 according to this invention would be approximately, for example, three feet in diameter and six feet long. The actual dimension of the cylindrical member, practically speaking, would depend on the length of the wire harness, and is, therefore, unrestricted. The continuous surface 27 of the cylindrical member 21 includes means for demountably receiving and securing thereon one or more lengths of wire according to a predetermined pattern. This invention contemplates two fundamental techniques for receiving and securing the several individual lengths of wire according to a predetermined pattern on the surface of the cylindrical member. As will be appreciated, the techniques can be used separately or in combination in carrying out the principles of this invention.

Figure 2:
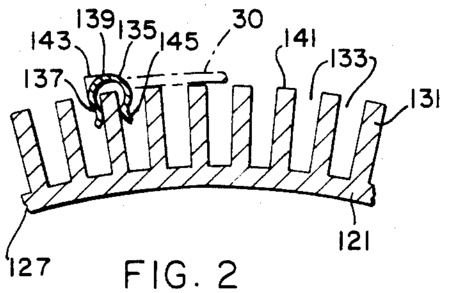
FIG. 2 is a partial sectional view of the wire harness fabrication apparatus of this invention illustrating one embodiment of the continuous surface thereof.

The elements of one technique can be seen in the detailed, partial illustration of a cylindrical member 121 shown in FIG. 2. The continuous surface 127 of the cylindrical member 121 includes a plurality of axially disposed, rib-like members 131 extending outwardly therefrom and defining between each adjacent pair of rib-like members 131 an access slot 133. The rib-like members 131 provide seats for a plurality of separate clip means 135 which are employed to secure and route the lengths of wire being positioned on the wire harness fabrication apparatus. The clip means 135 are adapted to be removably secured to the rib-like members 131 and are preferably formed in a generally U-shaped configuration with the legs 137 of the clip means positively biased toward one another. The legs 137 of the clip means 135 straddle a rib-like member 131, positively engaging the same and secure a length of wire 30 between the bridging portion 139 of the clip means 135 and the top 141 of a rib-like member 131. The clip means 135 can also include an upwardly extending grippable protuberance 143 which can be manually engaged by a worker or which can be adapted to be compatible with an industrial manipulator end effector for automatic systems applications. The legs 137 of the clip means 135 can be provided with an outwardly curved end portion as at 145 to facilitate mounting onto the rib-like members. The outwardly curved end portions 145 would spread the legs 141 apart as the clip means engaged the top 141 of the rib-like member 131 thus permitting the clip means to be readily mounted onto the rib-like member. The clip means described herein is but on configuration of a device which can be utilized to fasten wire to the apparatus of this invention.

Figure 3:
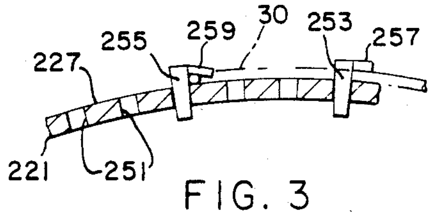
FIG. 3 is a partial sectional view of the wire harness fabrication apparatus of this invention illustrating an alternative embodiment of the continuous surface thereof.

A second technique for receiving and securing individual length of wire 30 according to a predetermined pattern can be appreciated through a consideration of FIG. 3. The continuous surface 227 of the cylindrical member 221 includes means for demountably receiving and securing thereon one or more lengths of wire according to a predetermined pattern. According to the second technique, the continuous surface 227 of the cylindrical member is provided with a plurality of bores 251 adapted to receive routing means 253 and wire securing means 255. The plurality of bores 251 are systematically disposed throughout the entire continuous surface 227 in order to provide a virtually infinite range of possibilities for defining the predetermined pattern of the wire harness. The routing means 253 are preferably pin-like members having a diameter adapted to provide a friction fit between the routing means and the bore into which it is removably inserted. The routing means 253 can include a cantilevered member 257 which bears against a length of wire, securing the wire to the continuous surface of the cylindrical member. The wire securing means 255 is preferably a pin-like member having a diameter adapted to provide a friction fit between the wire securing means 255 and the bore 251 into which it is removably inserted. The securing means 255 includes a means 259 thereon for engaging a length of wire and positively biasing the wire against the continuous surface. The wire engaging means 259 of the wire securing means 255 can be either a straight or downwardly curving cantilevered member (as illustrated). The friction fit of the pin-like member can be achieved by providing the pin-like member with a longitudinal slot as at 259 which permits compression of one end thereof during insertion.

Both the routing means and the wire securing means are of sufficient length to permit ease in handling in both manual and automated applications.

In point of fact, it is possible to provide a single device which effects the goals of both the wire routing means and the wire securing means. It is to be appreciated that the functional and structural relationship of the device to the continuous surface of the cylindrical member and the wire is determinative on the actual device configuration. Accordingly, design modifications to the structure of the wire routing means and wire securing means are possible without departing from the scope of the present invention.

As previously indicated, the wire harness fabrication apparatus of this invention can be utilized as an integral element in an automated manufacturing cell. Returning to FIG. 1 the wire harness fabrication apparatus 11 as described in detail above, particularly in connection with FIGS. 2 and 3, is illustrated in combination with several industrial manipulators. The actual industrial manipulators utilized are known in the art and will be described herein in broad functional terms. Moreover, due to the fact that access to the wire harness under fabrication by means of the present invention is achieved through the rotation of the cylindrical member, the actual disposition of the several industrial manipulators relative thereto is subject to a high degree of variability. The only requirement is that the manipulator must be able to approach within working range, any given location on the continuous surface at at least one rotational disposition of the cylindrical member.

In the operation of the exemplary system illustrated in FIG. 1, a three-axis servo controlled robot of the overhead gantry type, indicated at 61, functions as a means for picking up wire end securing means and routing means 255, 253) from a patterned tray or the like, and mounting them on the continuous surface of the cylindrical members as previously described. The robot gripper then picks up the end of the first length of wire which is typically the longest length to be laid, and attaches the end to a wire clamp. As the drum rotates, the arm 63 of the robot moves parallel with the axis of the cylindrical member along the gantry track 65. The wire is thereby laid in the desired pattern. At the end of a cycle which consists of the laying of one complete length of wire, the wire is cut by the wire feeder's metering end cutting mechanism at 67 and the robot gripper secures the second end of the wire in a technique which is similar to the technique employed to secure the first end of the wire. The cycle is then repeated until each individual length of wire is laid according to the predetermined pattern defined by the routing means disposed on the continuous surface. A wire tying tool 69 and a wire terminating tool 71 which strips the wire ends and applies the proper connector are mounted for independent movement along an X and Y axis guide rail system 73. After the desired number of wires are placed on the continuous surface, the wire tying tool 69 moves up to the drum and ties the wire as the drum rotates into position. The space between the rib-like member provides free access of the tie tool fingers to the wires.

Since all wire ends supported in clamps on the continuous surface can rotate to the plane of the terminating tool 71, the tool in combination with the robot's gripper terminates the wire ends. Once the wire harness is completed, it can be tested on the apparatus of this invention. Alternatively, by revising the rotation of the cylindrical member, the completed harness can be spooled onto a storage spool and sent to test or storage.

What has been described is a wire harness fabrication apparatus for both manual and automated wire harness fabrication.

I claim:

1. An apparatus for wire harness formation comprising:

support means defining an axis, a cylindrical drum-like member with opposed ends concentrically mounted on said axis for controllable rotational movement, said cylindrical drum-like member having a continuous surface which includes means defining a predetermined pattern of a wire harness and by means of which lengths of wire are routed on said continuous surface and means for demountably receiving and securing thereon one or more lengths of wire routed along said predetermined pattern to form a wire harness which receiving and securing means comprise a plurality of pin-like members and the continuous surface defines a plurality of bores disposed therein according to a predetermined pattern, each of said plurality of bores being adapted to removably receive one of said pin-like members therein, wherein one or more lengths of wire are secured to said pin-like members; and motive means in communication with said cylindrical drum-like member for effecting the controllable rotational movement thereof.

2. The apparatus for wire harness formation according to claim 1, wherein the axis on which the cylindrical wire receiving means is rotatably mounted is in a generally horizontal disposition.

3. The apparatus for wire harness formation according to the claim 1, wherein the axis on which the cylindrical wire receiving means is rotatably mounted is in a generally vertical disposition.

4. In combination with at least one industrial manipulator for at least placing a length of wire at a predetermined location as part of a wire harness, an apparatus for wire harness formation comprising:

support means defining an axis, a cylindrical drum-like member with opposed ends concentrically mounted on said axis for controllable rotational movement, said cylindrical drum-like member having a continuous surface which includes means defining a predetermined pattern of a wire harness and by means of which lengths of wire are routed on said continuous surface and means for demountably receiving and securing thereon one or more lengths of wire routed along said predetermined pattern to form a wire harness which receiving and securing means comprise a plurality of pin-like members and the continuous surface defines a plurality of bores disposed therein according to a predetermined pattern, each of said plurality of bores being adapted to removably receive one of said pin-like members therein, wherein one or more lengths of wire are secured to said pin-like members; and motive means in communication with said cylindrical drum-like member for effecting the controllable rotational movement thereof.

5. The apparatus for wire harness formation according to claim 4, wherein the axis on which the cylindrical wire receiving means is rotatably mounted is in a generally horizontal disposition.

6. The apparatus for wire harness formation according to claim 4, wherein the axis on which the cylindrical wire receiving means is rotatably mounted is in a generally vertical disposition.

* * * * *